US008810596B2

(12) United States Patent
Ahmann et al.

(10) Patent No.: US 8,810,596 B2
(45) Date of Patent: Aug. 19, 2014

(54) CURSOR FOR APPLICATION OF IMAGE ADJUSTMENTS

(75) Inventors: Douglas Joseph Ahmann, Woodbury, MN (US); Mark Lee Kawano, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 751 days.

(21) Appl. No.: 12/616,640

(22) Filed: Nov. 11, 2009

(65) Prior Publication Data

US 2011/0109646 A1    May 12, 2011

(51) Int. Cl.
| | |
|---|---|
| *G09G 5/00* | (2006.01) |
| *G06T 11/60* | (2006.01) |
| *G06T 15/30* | (2011.01) |
| *G06T 11/40* | (2006.01) |
| *G06F 3/0481* | (2013.01) |
| *G06F 3/0484* | (2013.01) |

(52) U.S. Cl.
CPC ........... *G06T 11/60* (2013.01); *G06T 15/30* (2013.01); *G06T 11/40* (2013.01); *G06F 3/0481* (2013.01); *G06F 3/04845* (2013.01)
USPC ........... 345/619; 345/661; 345/676; 345/639; 345/589; 345/590; 345/591; 345/592; 345/593; 345/594

(58) Field of Classification Search
CPC ......... G06T 11/60; G06T 15/30; G06T 11/40; G06F 3/0481; G06F 3/04845
USPC .......... 345/639, 589–594, 863, 661, 619, 676
See application file for complete search history.

(56) References Cited

U.S. PATENT DOCUMENTS

| | | | |
|---|---|---|---|
| 4,476,587 A | 10/1984 | Klie et al. | |
| 5,469,536 A | 11/1995 | Blank | |
| 5,999,190 A * | 12/1999 | Sheasby et al. | 345/589 |
| 6,268,865 B1 * | 7/2001 | Daniels et al. | 345/582 |
| 6,300,955 B1 | 10/2001 | Zamir | |
| 6,373,490 B1 * | 4/2002 | Bendiksen et al. | 345/441 |
| 6,628,295 B2 * | 9/2003 | Wilensky | 345/594 |
| 6,870,550 B1 * | 3/2005 | Schuster et al. | 345/639 |
| 6,870,954 B1 * | 3/2005 | Gupta | 382/162 |
| 7,123,269 B1 * | 10/2006 | Bourdev et al. | 345/589 |
| 7,593,603 B1 | 9/2009 | Wilensky | |
| 7,602,949 B2 | 10/2009 | Simon et al. | |
| 2002/0130908 A1 * | 9/2002 | Wilensky | 345/863 |
| 2007/0188510 A1 | 8/2007 | Kokemohr | |
| 2008/0075395 A1 | 3/2008 | Wallace et al. | |
| 2009/0043824 A1 | 2/2009 | Claghorn | |

OTHER PUBLICATIONS

"Macromedia Flash 5 Animation Part I", Apr. 2003, Rice University.*
Dave Nagel, "Adobe Illustrator Quick Tip: Radial Gradients", Jun. 29, 2006.*

(Continued)

*Primary Examiner* — Jin-Cheng Wang
(74) *Attorney, Agent, or Firm* — Fish & Richardson P.C.

(57) ABSTRACT

Systems and techniques are disclosed for applying an effect to a digital image using a cursor. An effect can be applied to an image at a region under a cursor. The cursor has an outer periphery and an effect indicating periphery within the outer periphery. The outer periphery defines a maximum extent to which the effect is applied. The effect indicating periphery indicates how the effect will be applied to the image, such as providing a visual indication of a softness setting.

25 Claims, 10 Drawing Sheets

(56) References Cited

OTHER PUBLICATIONS

Chris Botello, "Adobe Illustrator CS2 Revealed", Jan 1, 2005, Publisher: Course Technology PTR, pp. 2-20-2-34 and pp. 3-39-3-50.*

D. Giordan, et al. "How to Use Adobe Photoshop CS2", Aug. 5, 2005, pp. 327.*

Adobe Systems Incorporated, "Using Adobe Photoshop Lightroom 2", Sep. 3, 2009, 184 pages.

Peachpit.com, Mark Evening, "Localized Adjustments and Hand-Coloring with the Adjustment Brush Tool in Adobe Photoshop Lightroom 2", Feb. 13, 2009, www.peachpit.com/articles/article.aspx?p+1324275#at , 3 pages.

Adobe Systems Incorporated, "Using Adobe Photoshop CS4", Oct. 1, 2009, 705 pages.

* cited by examiner

CURSOR FOR APPLICATION OF IMAGE ADJUSTMENTS

TECHNICAL FIELD

This disclosure relates to editing media content such as digital images. In particular, a digital image displayed in a user-interface can be edited using a cursor to apply an effect.

BACKGROUND

Digital photography and digital videography have simplified taking, viewing, storing, and reproducing media content such as still images and video (i.e., a sequence of still images). Photographs can be taken either using high-end equipment such as digital single lens reflex (SLR) cameras, low resolution cameras including point-and-shoot cameras and cellular telephone devices with suitable capabilities. Video can be taken either using high-end professional equipment, hand held cameras such as a camcorders, digital video cameras, and cellular telephone devices with suitable capabilities. Images also can be produced by graphical editing software (e.g., image editing or drawing software), video equipment, rendering systems, scanners, tomography scanners, radio telescopes etc.

Software applications can be used to display and edit images obtained from a camera, video camera, or any other electronic image in a digital format. Using such a software application, various effects can be applied to an image.

SUMMARY

This document describes systems, methods, and devices for editing images using a cursor to apply an effect corresponding a defined brush. The effect can be applied to an image at a region under the cursor. The cursor has an outer periphery and an effect indicating periphery within the outer periphery. The outer periphery defines a maximum extent to which the effect is applied. The effect indicating periphery indicates how the effect will be applied to the image, such as providing a visual indication of a softness setting. Softness can refer to how hard or how soft the edges of a brush are. For example, the effect can be applied at a maximum intensity in an area within the center of the cursor and can fall-off to minimum intensity at the outer periphery. The amount of fall-off can vary depending on a softness setting of the brush.

The location of the effect indicating periphery with respect to the outer periphery can enable a user to visualize how the softness of the effect will be applied. For example, the effect indicating periphery can indicate a demarcation between where the effect appears near the maximum intensity and where the effect appears to fall-off towards a minimum intensity.

Among other potential advantages, the systems and techniques described here can help a user select brush settings by enabling a user to visualize, as the user is selecting the brush settings, the extent of the application of an effect and how an effect will be applied to an image. For example, when a user selects (or adjusts) brush settings such as a softness setting or a brush size setting, a cursor, having an effect indicating periphery and an outer periphery, is based on the selected (or adjusted) brush settings. As the softness setting is adjusted, the size of the effect indicating periphery is changed while the outer periphery is maintained at a fixed brush size, allowing a user to visualize how a change in the softness setting will affect the application of an effect within a fixed cursor size. The softer the brush, the smaller the effect indicating periphery becomes with respect to the outer periphery. The harder the brush, the larger the effect indicating periphery becomes with respect to the outer periphery. When a user adjusts a brush size setting, the inner periphery and the outer periphery also change in proportion to the change in the brush size.

In a first aspect, a computer readable medium can be encoded with a computer program, the program comprising instructions that when executed by a data processing apparatus cause the data processing apparatus to perform operations including: displaying an image on a display device associated with a computer; displaying a cursor over a region of the image, the cursor having an outer periphery and an effect indicating periphery within the outer periphery; applying an effect at the region: to a first degree within an inner area defined by an inner periphery located within the outer periphery, and variably across an outer area defined by the inner periphery and the outer periphery, the effect being graduated from a first intensity at the inner periphery to a second intensity at the outer periphery according to an intensity distribution; and wherein displaying the cursor comprises displaying the effect indicating periphery along a predefined intensity of the distribution between the outer periphery and the inner periphery.

Implementations can include any or all of the following features. Applying the effect to a first degree within the inner area can include applying the effect at a maximum intensity within the inner area. Also, the first intensity can include the maximum intensity and the second intensity can include a minimum intensity. The predefined intensity can be approximately 50 percent of the maximum intensity. Additionally, the program can include further instructions that when executed by the data processing apparatus cause the data processing apparatus to perform operations including: receiving a first setting corresponding to a size of the inner periphery; and adjusting the size of the inner periphery according to the first setting while maintaining a fixed size of the outer periphery. Also, the first setting can include a softness setting. Additionally, the program can include further instructions that when executed by the data processing apparatus cause the data processing apparatus to perform operations including: receiving a second setting corresponding to a cursor size; and adjusting the size of the outer periphery, based on the second setting and not based on the softness setting. Also, the program can include further instructions that when executed by the data processing apparatus cause the data processing apparatus to perform operations including displaying the cursor, including the outer periphery and the effect indicating periphery and adjusting the size of the effect indicating periphery dynamically as a softness setting is received while maintaining a fixed size of the outer periphery.

In another aspect, a computer readable medium can be encoded with a computer program, the program including instructions that when executed by a data processing apparatus cause the data processing apparatus to perform operations including: receiving an adjustment to a softness setting for a brush, the brush being adapted to apply an effect to a digital image; displaying the softness setting as the adjustment is received; displaying, as the adjustment is received, a cursor corresponding to the brush based on the adjusted softness setting, the cursor having an outer periphery indicating a maximum extent of an effect to be applied with the brush and an effect indicating periphery within the outer periphery indicating a softness of the brush, the effect indicating periphery changing size according to the received adjustment.

Implementations can include any or all of the following features. The program can include further instructions that when executed by the data processing apparatus cause the data processing apparatus to perform further operations including: receiving an adjustment to a size setting for the brush, a size of the effect indicating periphery can be proportional to the brush size setting and based on a softness setting, and a size of the outer periphery is proportional to the brush size setting and not the softness setting. Also, outer periphery can be displayed at a fixed size while the effect indicating periphery changes size. Additionally, the program can include further instructions that when executed by the data processing apparatus cause the data processing apparatus to perform further operations including: moving the displayed cursor over a region of an image after receiving the adjustment; and applying an effect to the image at the region, the effect being applied at a maximum intensity within an inner periphery that is located within the outer periphery, and the effect being applied from a maximum intensity at the inner periphery to a minimum intensity at the outer periphery; and wherein a size of the inner periphery is based on the softness setting and on a brush size setting. Also, the effect indicating periphery can be located halfway between the outer periphery and the inner periphery.

In another aspect, a system can include: a first memory device for storing a media content item that includes a digital image; and a computing system including processor electronics configured to perform operations including: displaying an image on a display device associated with a computer, receiving brush settings, including a brush size setting and a softness setting, displaying a cursor corresponding to the brush based on the brush settings over a region of the image, the cursor having an outer periphery and an effect indicating periphery within the outer periphery, applying an effect at the region: to a first degree within an inner area defined by an inner periphery located within the outer periphery, and variably across an outer area defined by the inner periphery and the outer periphery, the effect being graduated from a first intensity at the inner periphery to a second intensity at the outer periphery according to an intensity distribution, and wherein displaying the cursor comprises displaying the effect indicating periphery between the outer periphery and the inner periphery.

Implementations can include any or all of the following features. The intensity distribution can include an S-curve. Also, applying the effect to a first degree within the inner area can include applying the effect at a maximum intensity within the inner area. The first intensity can include a maximum intensity and the second intensity can include a minimum intensity. Also, the processor electronics can be configured to perform further operations including displaying the cursor as the softness setting is received, the effect indicating periphery changing size while the outer periphery is displayed at a fixed size. Additionally, a radius of the inner periphery can be based on the softness setting such that the softer the softness setting the smaller the radius of the inner periphery and based on the brush size setting such that the larger the brush size setting the larger the inner periphery; and displaying the effect indicating periphery between the inner periphery and the outer periphery can include displaying the effect indicating periphery a predefined percentage of a distance from the inner periphery to the outer periphery. Also, the predefined percentage can be 50 percent.

In another aspect, a computer-implemented method can include: displaying an image on a display device associated with a computer; displaying a cursor over a region of the image, the cursor having an outer periphery and an effect indicating periphery within the outer periphery; applying an effect at the region: to a maximum intensity within an inner area, the inner area defined by an inner periphery located within the outer periphery, and variably across an outer area, the outer area defined by the inner periphery and the outer periphery, graduated from the maximum intensity at the inner periphery to a minimum intensity at the outer periphery according to an intensity distribution; and wherein displaying the cursor comprises displaying the effect indicating periphery along a predefined intensity of the distribution according to a softness setting.

Implementations can include any or all of the following features. The predefined intensity can be approximately 50 percent of the maximum intensity. Also, a radius of the outer periphery can be based on a brush size setting and not the softness setting. A radius of the inner periphery can include a percentage of the radius of the outer periphery; and the percentage can be based on the softness setting. Also, the method can also include: displaying brush settings corresponding to the cursor, including the brush size setting and the softness setting; receiving adjustments changing the softness setting; and displaying the cursor according to adjustments as the softness setting changes, including displaying the effect indicating periphery changing in size while outer periphery is displayed at a fixed size.

Details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

A cursor is presented in the context of image editing and is used to apply an effect corresponding to a defined brush. The cursor illustrates a region in an image where the effect is applied. The cursor includes an outer periphery that indicates the extent of the application of the effect. The cursor also includes an effect indicating periphery located within the outer periphery that provides a visual indication of how the effect will be applied. For example, the location of the effect indicating periphery with respect to the outer periphery can indicate a brush softness for applying the effect with the cursor (i.e. the extent of an edge of the effect that will be softened). In some examples, the effect indicating periphery can indicate a demarcation between where the applied effect appears near a maximum intensity and where the applied effect appears to fall-off towards a minimum intensity.

The location of the effect indicating periphery with respect to the outer periphery can be based on a brush setting such as a softness setting. The harder the brush setting, the closer the effect indicating periphery will be to the outer periphery. The softer the setting, the further the effect indicating periphery will be from the outer periphery. Also, the size of the cursor can be based on a brush size setting.

As the brush settings, including a softness setting and a brush size setting, are received (or adjusted), the cursor (outer periphery and a effect indicating periphery) can be displayed based on the received (or adjusted) brush settings. Dynamically displaying the cursor as the brush settings are received (or adjusted) provides a user with a visual indication of extent of an effect and how the effect will be applied. This in turn can assist in selecting the brush settings without having to actually use the brush to see how the effect will be applied.

Figure 1:
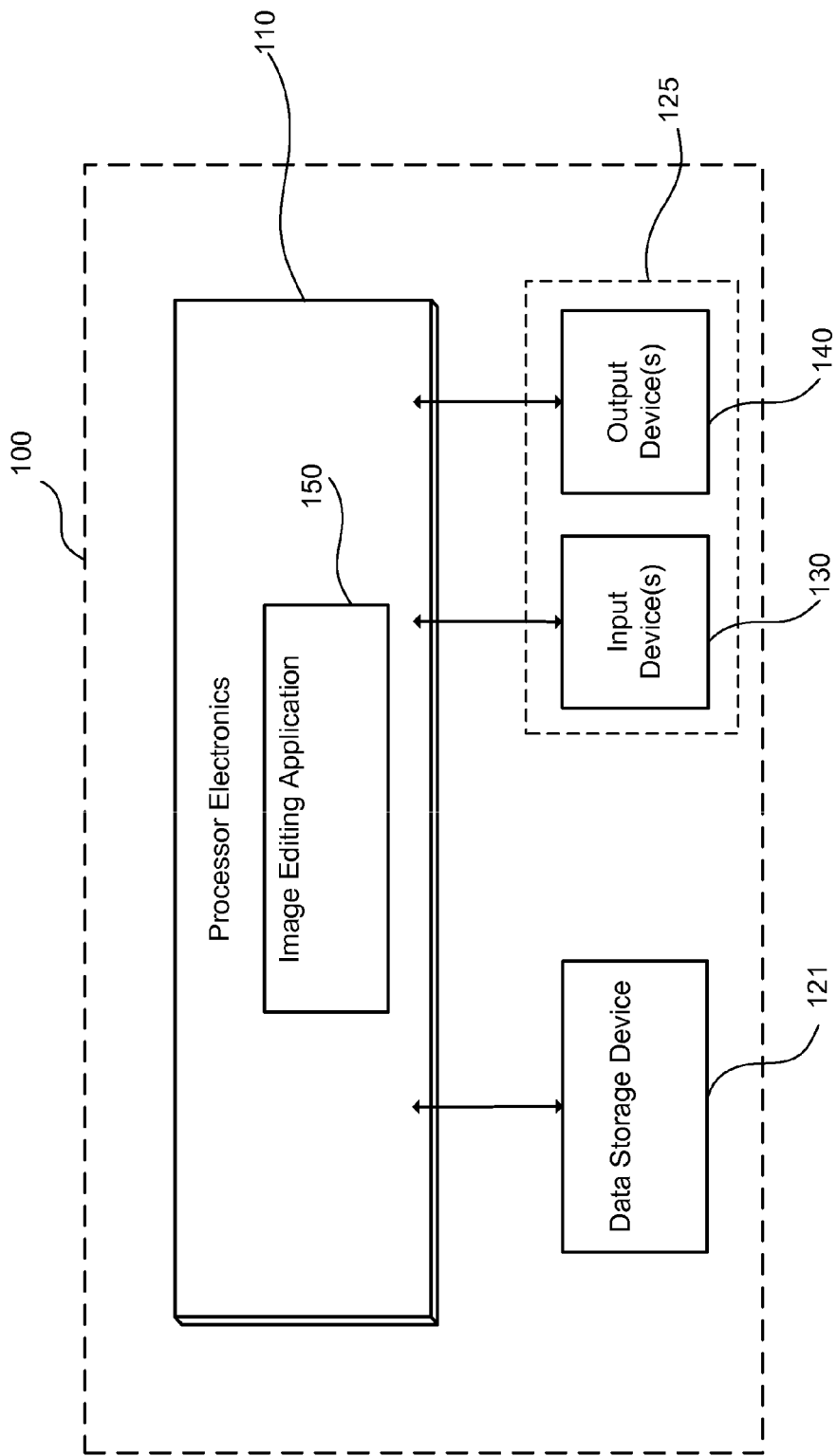
FIG. 1 is a schematic that shows an example of a system for editing images.

FIG. 1 is a schematic that shows an example of a system 100 for editing images. The system 100 includes processor electronics 110, such as a data processing apparatus, communicatively connected to a data storage device 121 and to a user interface 125. The user interface 125 can include one or more input devices 130 (e.g. a mouse, a keyboard, etc.), and one or more output devices 140 (e.g. a monitor, speakers, etc.). The data processing electronics 110 can also operate an image editing application 150.

One or more images stored on the data storage device 122 can be uploaded to and displayed in the image editing application 150. The data storage device can include various devices capable of storing media content items, such as memory cards, flash media, hard drives (e.g., internal hard drives, external hard drives), USB drives, optical media, and the like. The data storage device 121 can be communicatively connected to the processor electronics 110 via a communications network, via a wireless communications link, and/or via a cable connection (e.g. via USB, a high speed serial bus, parallel port, SCSI, SATA, IDE, etc.).

A user can interface with the image editing application 150 via the user interface 125. Once an image is displayed in an image editing application, the user can use the image editing application 150 to make adjustments to the image. The image editing application 150 can include various tools that the user can select from to make such adjustments. For example, the user can select a brush to apply an effect and/or brush settings for the brush, such as brush size and softness. The user can also select an effect to be applied to an image using a brush. For example, a brush can be used to paint various colors onto an image, retouch various portions of an image, clone image portions onto another region of the image. Also, a brush can be used to adjust various attributes of an image, such as hue, saturation, contrast, color temperature, tint, exposure, definition, sharpness, luminance, and other image characteristics. In some examples, a brush can be used to apply a mask to an image through which various such attributes can be adjusted.

Figure 2A:
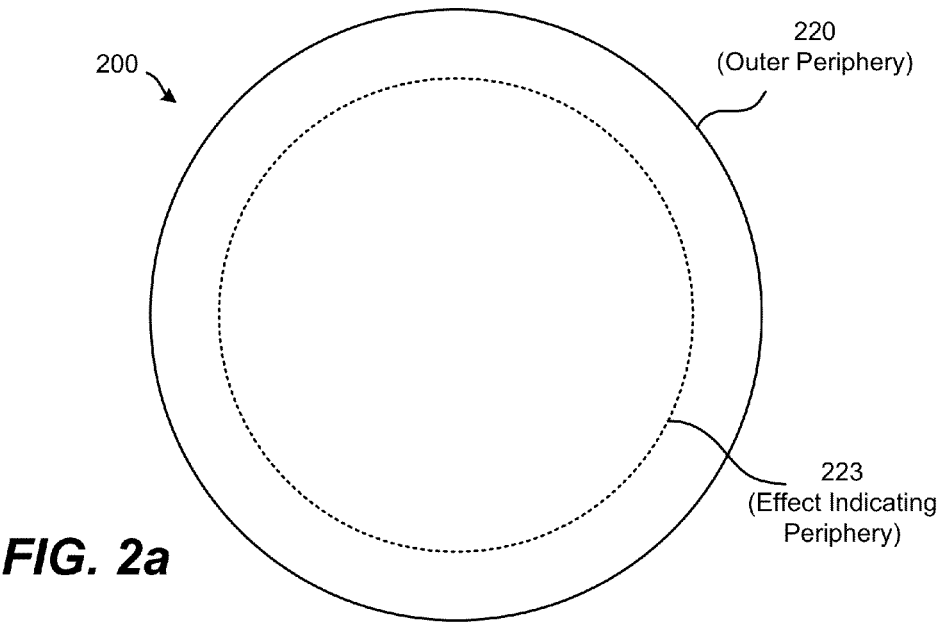
FIGS. 2a-2c show an example cursor associated with a brush used to apply an effect to an image.

FIG. 2a shows an example cursor 200 associated with a brush used to apply an effect to an image. The cursor 200 shown in FIG. 2 is a circle. The cursor 200 can also be other shapes such as an oval, a square, a non-symmetrical shape, etc. The cursor includes an outer periphery 220 and an effect indicating periphery 223. The effect indicating periphery 223 is locating within the outer periphery 220.

The outer periphery 220 indicates the extent to which the effect will be applied to an image. For example, when the cursor is displayed over an image, an the effect is applied to the region of the image within the cursor area defined by the outer periphery 220. The cursor 220 can also be adjusted to various sizes, e.g., by adjusting a brush size setting. The brush size setting dictates the size of the outer periphery 220 and can affect the size of the effect indicating periphery 223.

The effect indicating periphery 223 provides a visual indication of how the effect will be applied. For example, the location of the effect indicating periphery with respect to the outer periphery can indicate the softness of the effect to be applied with the cursor. The harder the brush, the closer the effect indicating periphery is to the outer periphery; the softer the brush the further the effect indicating periphery is from the outer periphery.

A user can use a mouse to move the cursor 200 to a desired location over an image. The user can click the mouse which causes the effect to be applied to the image according to a brush size setting and according to the softness setting. With a single click the effect is applied in a single dab, i.e., within the area of the outer periphery 220. If the mouse is clicked and dragged, the effect is applied in a stroke—a series of overlapping dabs.

Figure 2B:
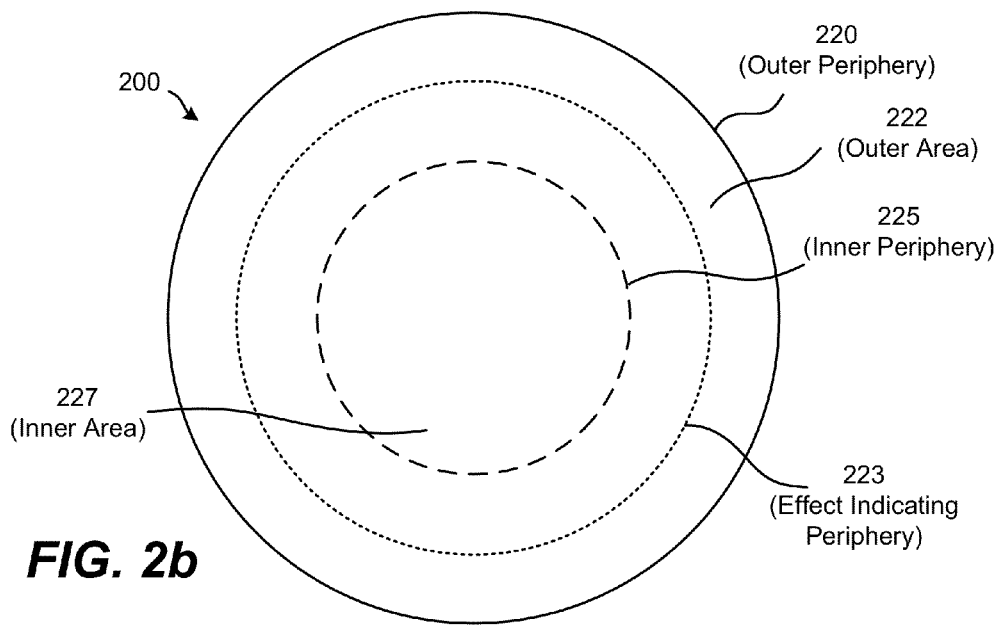

FIG. 2b also shows the example cursor 200 used to apply an effect to an image. An inner periphery 225 is shown within the outer periphery to facilitate description of an example how the effect can be applied and how the location of the effect indicating periphery can be determined. The inner periphery 225 defines an inner area 227. The inner periphery 225 and the outer periphery 220 define an outer area 222. The size of the inner periphery is dictated by a softness setting for a brush associated with the cursor. When the cursor is over a region of the image, the effect is applied at the region of the image to a first degree within the inner area. For example, the first degree can be a maximum intensity, such that the effect is applied at a maximum intensity across the inner area.

Figure 2C:
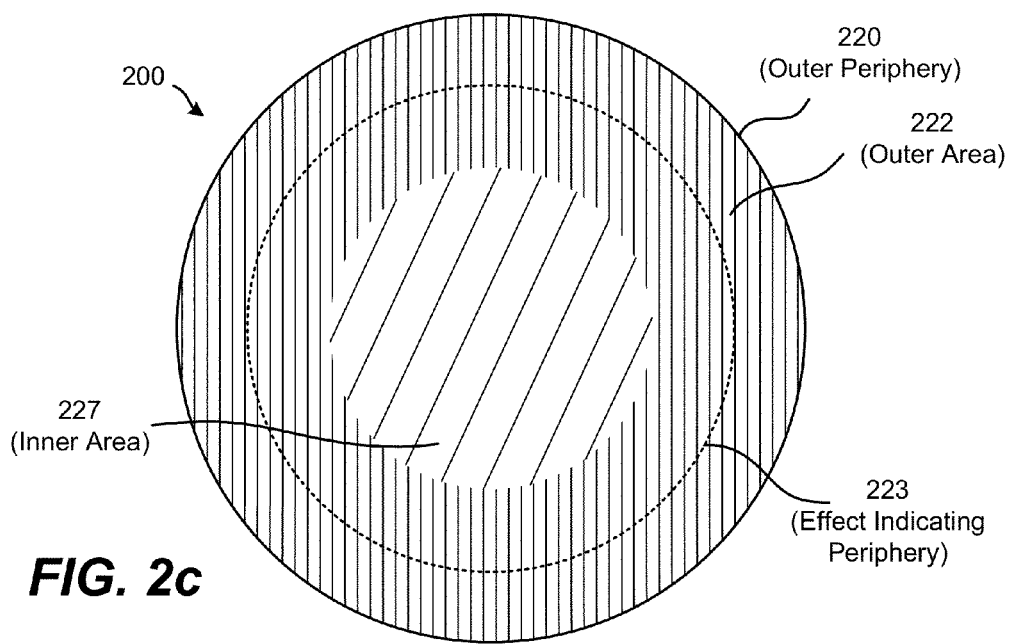

The effect is also applied to a second degree within the outer area 222. (FIG. 2c shows the outer area 222 with hatch marks, indicating the location where the second degree is applied, and the inner area 227 with cross hatch marks, indicating the area where the first degree is applied.) For example, the effect can be applied variably across the outer area 222 graduated from a first intensity at the inner periphery 225 to a second intensity at the outer periphery 220 according to an intensity distribution. In particular, the intensity can be graduated from a maximum intensity (the first intensity) at the inner periphery, to a minimum intensity (the second intensity) at the outer periphery according to an intensity distribution. In other words, the intensity can soften from the inner periphery 225 to the outer periphery 222. Various distributions can be used, such as a linear distribution, a Gaussian distribution, and S-curve distribution, a customized distribution, etc.

Also, the effect indicating periphery 223 can be displayed along a predefined intensity of the distribution (anywhere from the inner periphery to the outer periphery) to provide a user a visual indicator of how the intensity is distributed across the outer area 222. The effect indicating periphery 223 can indicate the location where the intensity of an effect visually appears to a user to begin to soften. In some examples, the effect indicating periphery 223 can indicate a demarcation between where the effect appears near the maximum intensity and where the effect appears to fall-off towards a minimum intensity. In some examples, the effect indicating periphery can be displayed coextensive with the inner periphery 225, in order to show a demarcation between the first degree in the inner area and the second degree in the outer area. In the example described above where the intensity is graduated from a maximum at the inner periphery to a minimum at the outer periphery, the effect indicating periphery 223 can be displayed along a predefined intensity such as 50% of the maximum intensity in order to provide a user an indication of how much of the edge of the cursor appears to be softened.

In an example S-curve distribution, the rate of change of the intensity is slow near the inner periphery where the intensity is near a maximum intensity. As the distribution nears a half-way point between the inner periphery and the outer periphery, the rate of change of the intensity increases to a maximum rate of change. As the distribution nears the outer periphery, the rate of change is slow as the intensity moves towards a minimum intensity. In such an example, the effect indicating periphery can be located at the half-way point between the outer periphery and the inner periphery, showing the maximum rate of change of the intensity distribution.

In some examples, a radius of the outer periphery 220 from (i.e. from the center of the cursor to the outer periphery 220) is based on a brush size setting. The larger the brush size setting the larger the radius of the outer periphery 220. Also, a radius of the inner periphery 225 (i.e. from the center of the cursor to the inner periphery 225) can be a percentage of the radius of the outer periphery 220 where the percentage is based on the softness setting, (e.g., the softer the softness setting, the smaller the percentage; the harder the softness setting, the larger the percentage. The inner periphery 225 can also be located a predefined distance between the outer periphery 220 and the inner periphery 225, such as half-way.

Figure 3A:
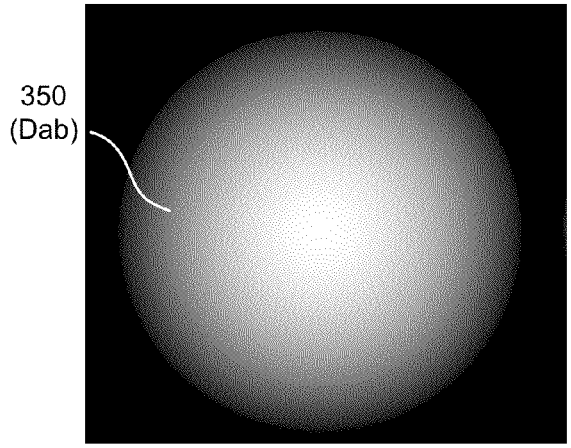
FIGS. 3a-3c show an example effect applied using a cursor.
Figure 3B:
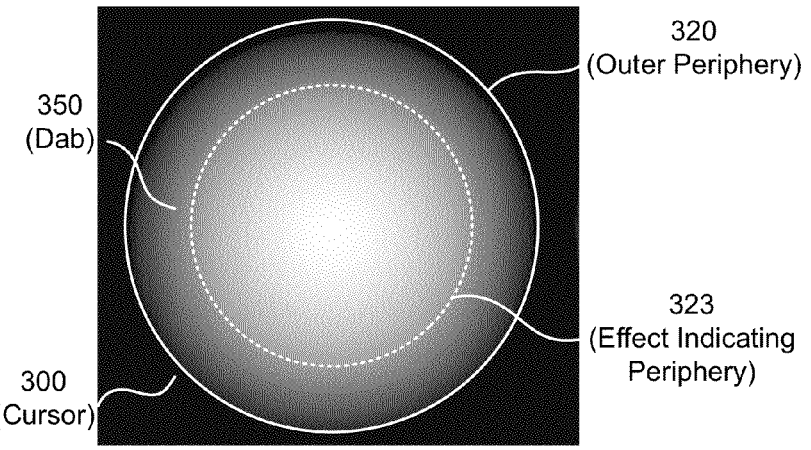
Figure 3C:
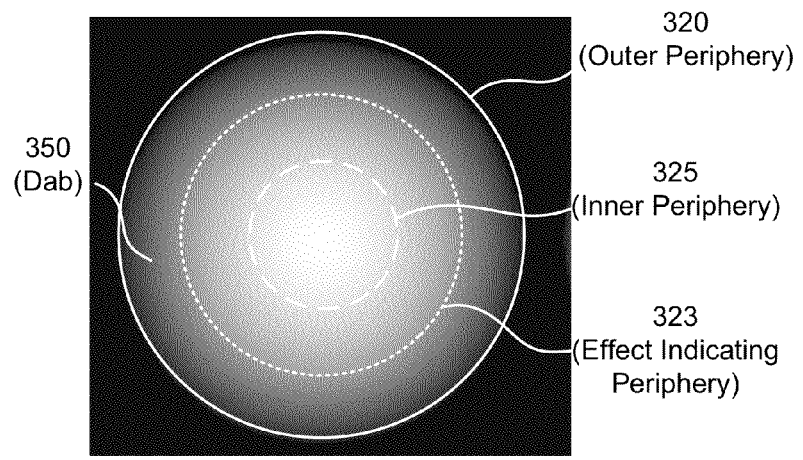

FIGS. 3a-3b show an example effect applied using a cursor 300. As can be seen in FIG. 3a a dab 350 has been applied with a circular brush that has been softened. The effect is white applied to a black background. FIG. 3b shows the dab 350 and the cursor 300 used to apply the dab 350. The cursor 300 is located over the region where the dab 350 was applied. The cursor 300 has an outer periphery 320 showing the maximum extent of the application of the effect. The cursor also has an effect indicating periphery 323, indicating a demarcation between where the effect appears near the maximum intensity and where the effect appears to fall-off towards a minimum intensity. FIG. 3c shows the dab 350 and the cursor 300. FIG. 3c additionally shows an inner periphery 325. The intensity of the effect is applied at a maximum within the inner periphery. The effect is also applied variably from the maximum intensity at the inner periphery to a minimum intensity at the outer periphery 320. The manner in which the effect changes from a maximum intensity at the inner periphery 325 to a minimum intensity at the outer periphery 320 is based on a predefined S-curve intensity distribution. The effecting indicating periphery 323 is displayed half-way between the inner periphery 325 and the outer periphery 320. Also, the effect indicating periphery 323 is located along an intensity of the distribution of about 50% of the maximum intensity.

Figure 4:
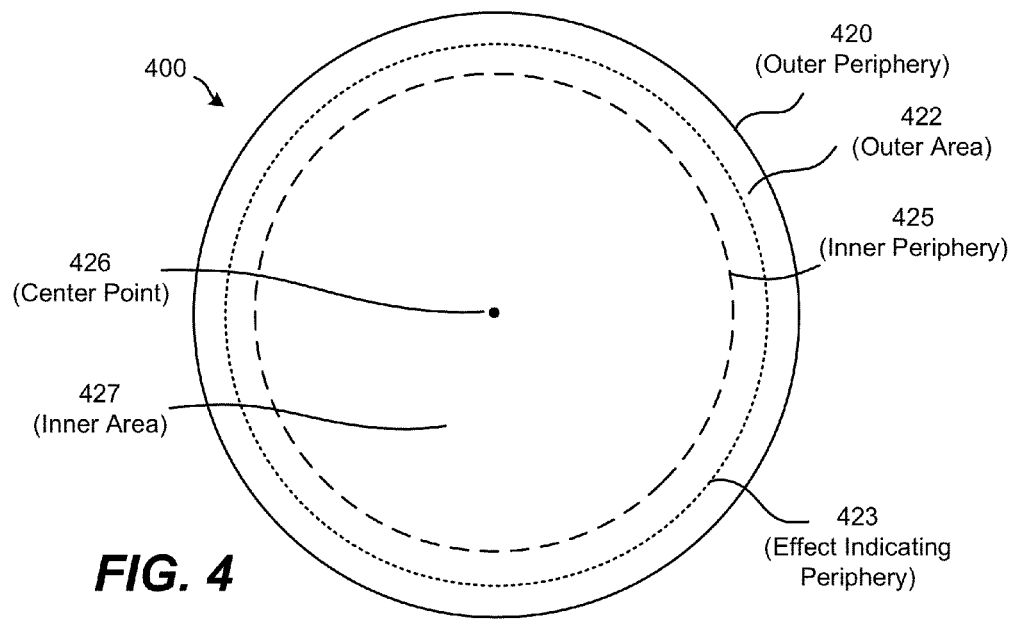
FIG. 4 shows an example cursor for applying an effect to an image.

FIG. 4 shows an example cursor 400 for applying an effect to an image. The cursor 400 has an outer periphery 420 and an inner periphery 425 based on a brush size and brush softness setting. Also shown is an inner periphery 425 that defines a inner area 427. The inner periphery 425 and the outer periphery 420 define an outer area 422. The cursor 400 has the same brush size as cursor 200 shown in FIGS. 2a-2c. However, cursor 400 has a lower softness setting than cursor 200. Therefore, the inner periphery 425 shown in FIG. 4 is larger than the inner periphery 225 shown in FIG. 2b. And thus, the outer area 222 shown in FIG. 2b is larger than the outer area 422 shown in FIG. 4. Accordingly, the effect indicating periphery 423 in cursor 400 is larger that the effect indicating periphery 223 in FIGS. 2a-2c. Also, the inner area 427 shown in FIG. 4 is larger than the inner area 227 shown in FIG. 2b.

FIGS. 5a-5d and FIGS. 6a-6c show an example display 500 (e.g. a floating palette) for setting brush settings, including brush size and brush softness. The display 500 can indicate the brush settings for a particular type of effect to be applied to an image. The name of the effect (e.g. "Lighten") can appear in a title 505 of the display 500.

When the display 500 is used to select (or adjust) a brush size setting and/or a softness setting, a cursor 550 can be displayed that corresponds to the selected settings. The cursor 550 has an outer periphery 555 and an effect indicating periphery 560. Displaying the cursor as the brush size and softness settings are adjusted, provides a user with a visual indication of how large and how soft the brush is that will apply the effect to an image.

The display 500 has a brush size slider 510. By sliding the brush size slider 510 from left to right, the size of the brush is adjusted. A numeric value associated with the brush size is indicated in a brush size value field 515. The brush size can also be adjusted directly in the brush size value field 515. The display 500 also has a softness slider 520. By sliding the softness slider 520 from left to right, the softness of the brush can be adjusted. A numeric value associated with the softness of the brush is indicated in a softness value field 525. The softness of the brush can also be adjusted directly in the softness value field 525.

Figure 5A:
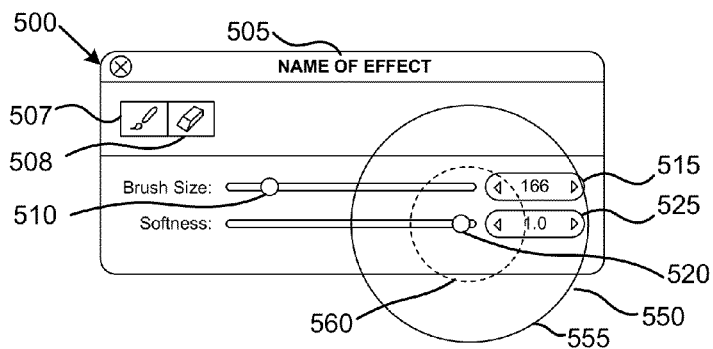
FIGS. 5a-5d and FIGS. 6a-6c show an example display for setting brush settings.
Figure 5B:
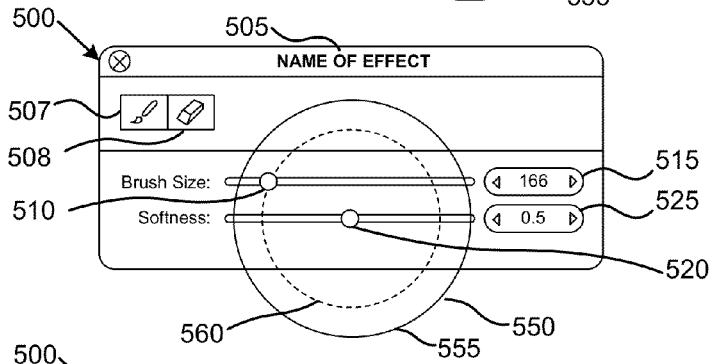

FIGS. 5a-5b show the softness setting being adjusted at a fixed brush size. The size in each of FIGS. 5a-5b is set to 166 and thus the size of the outer periphery 555 is the same throughout FIGS. 5a-5b. As a user selects or changes the softness setting, the cursor 550 is displayed over the softness slider 520. For example, as the softness setting is changed by sliding the softness slider 520 to the left, the cursor 550 also moves to the left following the slider 520.

Figure 5C:
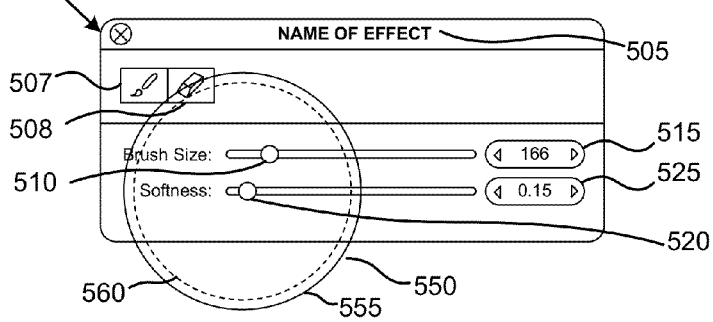
Figure 5D:
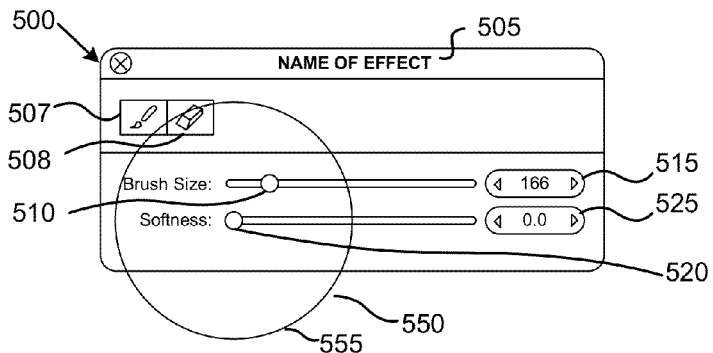

As the cursor 550 moves left, the cursor also changes according to the changes in softness settings. For example, in FIG. 5a, the softness setting is set to maximum softness of 1.0. As a user selects the softness setting of 1 using either the softness slider 520 or using the softness value field 525, the cursor 550 is displayed with an effect indicating periphery 560 having a size corresponding to the softness setting. As the softness is decreased, e.g., by sliding the slider to the left, the effect indicating periphery 560 increases in size. In FIG. 5b at a softness setting of 0.5, the effect indicating periphery 560 is larger than shown in FIG. 5a at a maximum softness setting of 1.0. In FIG. 5c at a softness setting of 0.15, effect indicating periphery 560 is larger than shown in FIGS. 5a and 5b at settings of 1.0 and 0.5 respectively. In FIG. 5d, the softness setting is set to 0.0 and therefore the brush has no softness. Accordingly, there is no effect indicating periphery 560 shown in FIG. 5d. The cursor 550 only has an outer periphery 555 corresponding to the brush size 166.

Figure 6A:
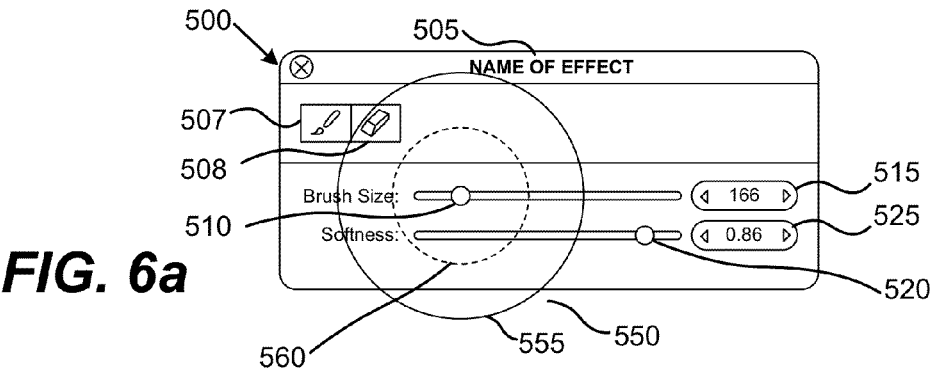
Figure 6B:
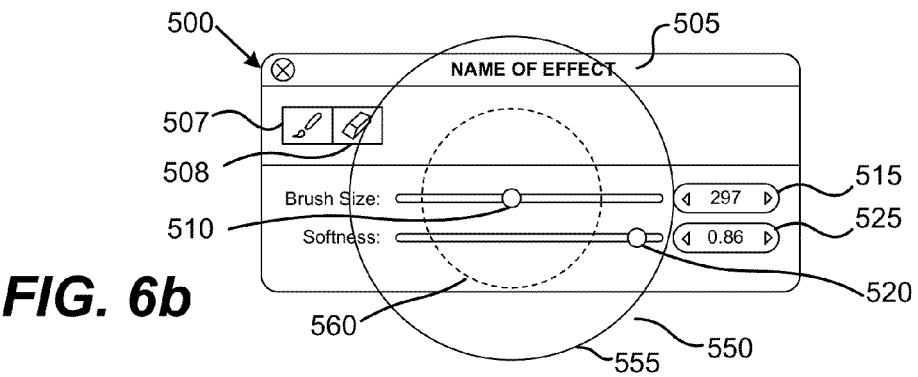
Figure 6C:
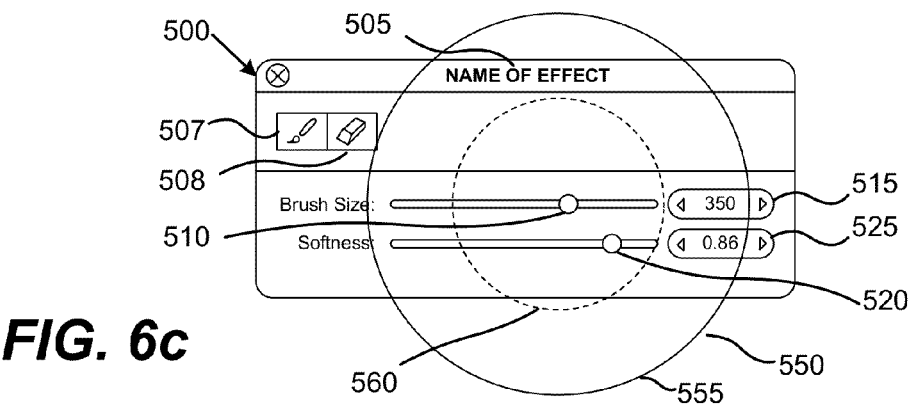

FIGS. 6a-6c show the size setting being adjusted at a fixed softness. The softness in each of FIGS. 6a-6c is set to 0.86. As a user selects or changes the brush size setting, the cursor 550 is displayed over the brush size slider 510. For example, as the brush size setting is changed by sliding the brush size slider 510 to the right, the cursor 550 also moves to the right following the brush size slider 510.

As the cursor 550 moves right, the cursor also changes according to the changes in the brush size settings. For example, in FIG. 6a, the size setting is set to 166. As a user selects the size setting of 166 using either the brush size slider 510 or using the brush size value field 515, the cursor 550 is displayed with the outer periphery 555 having a size corresponding to the brush size setting and an effect indicating periphery 560 having a size corresponding to the softness setting and to the brush size setting. As the size is increased, e.g., by sliding the slider to the right, the outer periphery 555 and the effect indicating periphery 560 increase in size each proportional to the increase in brush size setting. In the example shown in FIGS. 6a-6c, the size of the effect indicating periphery 560 adjusts with the brush size increase because the softness does not change. Accordingly, the relative location of the effect indicating periphery 560 with respect to the outer periphery 555 does not change. Also, an inner periphery of cursor 550 (not shown) where a maximum intensity is to be applied also increases in size.

In FIG. 6b at a size setting of 297, both the outer periphery 555 and the effect indicating periphery 560 are larger than shown in FIG. 6a at a brush size setting of 166. In FIG. 6c at a brush size setting of 350, both the outer periphery 555 and the effect indicating periphery 560 are larger than shown in FIGS. 6a and 6b at brush size settings of 166 and 297 respectively.

Figure 7:
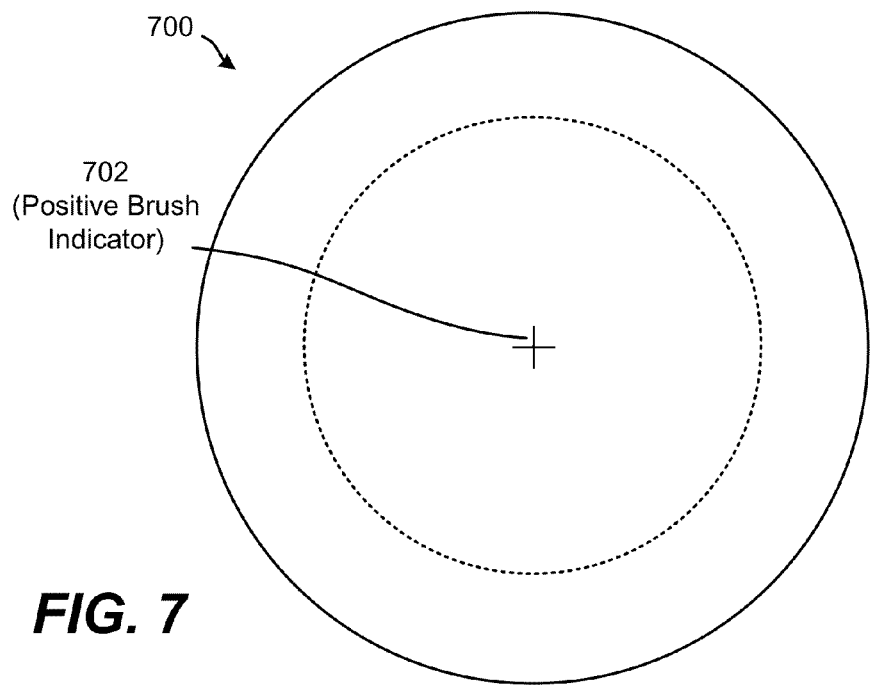
FIGS. 7-8 show example cursors.
Figure 8:
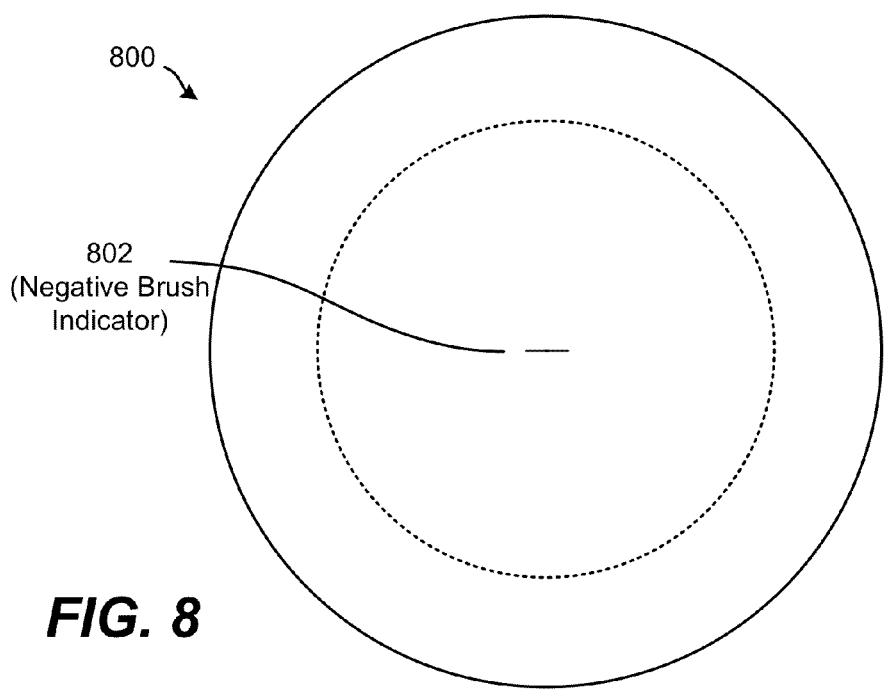

The display 500 also has a brush-in button 507 for selecting a positive brush or a eraser button 508 for selecting a negative brush. For example, the effect can be applied by using a positive brush to brush-in the effect onto an image. The effect can also be applied by using a negative brush to brush-away an effect from an image. A cursor with both size and softness settings can be used for either a positive brush or a negative brush. FIG. 7 shows an example cursor 700 with a positive brush indicator 702 at the center showing that an effect will be brushed-in. FIG. 8 shows a cursor 800 with a negative brush indicator 802 at the center showing that an effect will be applied by brushing away the effect from an image.

In some examples, the size of the cursor is also proportionate to the scale at which the image is being displayed. For example, if the brush radius is set to 100 and the image is being displayed at a scale of 100% (1:1), then the cursor will have a radius of 100 pixels. If the brush radius is set to 100 and the image is being displayed at scale of 50%, the cursor displayed will have a radius of 50 pixels. The relative locations of the inner and outer periphery are proportionate relative to the scale as well.

Figure 9:
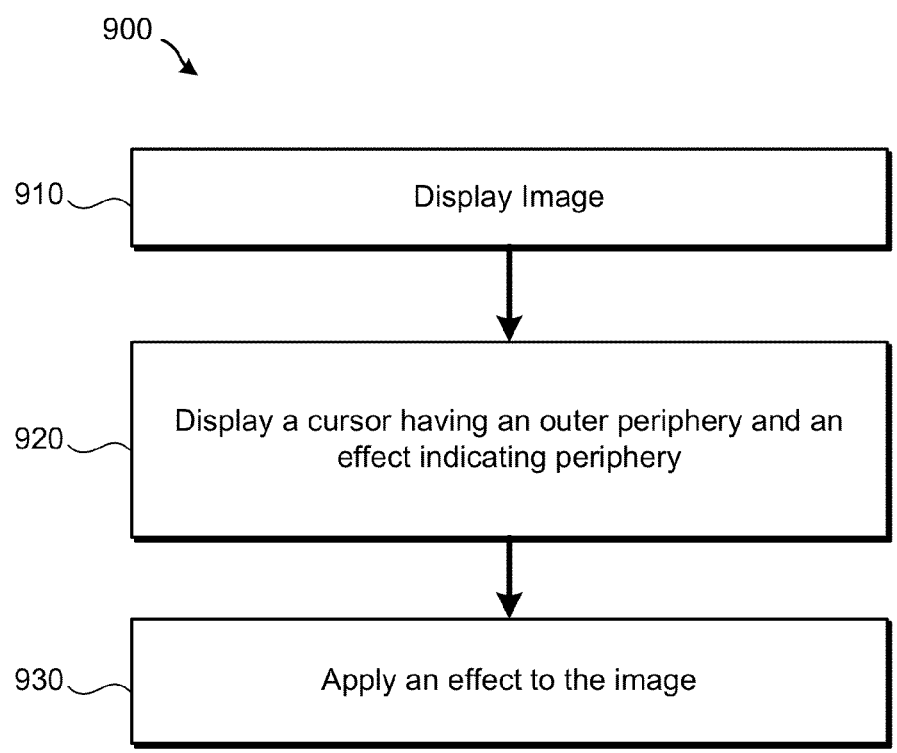
FIG. 9 shows an example process for applying an effect using a cursor with an outer periphery and an effect indicating periphery.

FIG. 9 shows an example process 900 for applying an effect using a cursor with an outer periphery and an effect indicating periphery. At 910 an image is displayed on a display device associated with a computer for editing. The image can be displayed, for example, in an image editing application. At 920 a cursor is displayed over a region of the image where the image is to be edited. The cursor has an outer periphery and an effect indicating periphery within the outer periphery.

At 930 an effect is applied at the region. The effect is applied at the region to a first degree within an inner area. The first degree can include a maximum intensity, such that applying the effect within the inner area includes applying the effect at a maximum intensity within the inner area. The inner area is defined by an inner periphery located within the outer periphery. The size of the inner area can be based on a softness setting. Also, an outer area is defined by the inner periphery and the outer periphery. The effect is applied variably across the outer area, graduated from a first intensity at the inner periphery to a second intensity at the outer periphery according to an intensity distribution. The first intensity can include the maximum intensity at the inner periphery and the second intensity can include a minimum intensity at the outer periphery. In this manner, an effect can be applied with a softness from the inner periphery to the outer periphery. Also, displaying the cursor at 920 includes displaying the effect indicating periphery along a predefined intensity of the distribution. In some examples, the predefined intensity can be approximately 50% of the maximum intensity.

Figure 10:
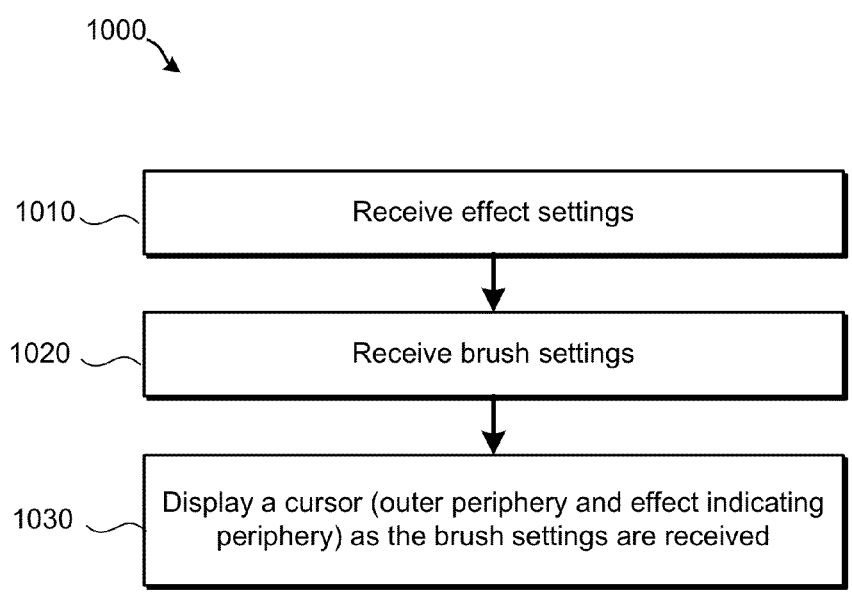
FIG. 10 shows an example process for displaying a cursor with an effect indicating periphery while brush settings are adjusted.

FIG. 10 shows an example process 1000 for displaying a cursor with an effect indicating periphery and an outer periphery while brush settings are adjusted. Having a visual indication of the brush size (outer periphery) and how soft the effect will be applied (inner periphery) as the brush settings are received, can help a user determine the appropriate brush settings. At 1010 effect settings are received. For example, a type of effect to be applied to an image can be selected. Another effect setting can include an overall strength of the effect to be applied. At 1020 brush settings, including a brush size setting and a softness setting are received. For example, a display (e.g. a floating palette) in an image editing application can be configured to receive brush size settings and a softness settings.

At 1030 a cursor is displayed as the brush settings are received, providing a user with a visual indication of how the effect will be applied with the brush at the received brush settings. The cursor has an outer periphery and an effect indicating periphery. As the brush settings are received, the cursor is displayed according to those received brush settings. The outer periphery is a function of the brush size setting. As the brush size setting is received (or changed) the outer periphery displayed according the received (or changed) brush size setting. The effect indicating periphery can be a function of both brush size setting and the softness setting. Therefore, the size of the effect indicating periphery is displayed according to received (or changed) brush size and softness settings. In some examples, a change in the size of the effect indicating periphery can be displayed as adjustments to the softness setting are received while the outer periphery is maintained at a fixed size.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a machine or computer readable medium. The machine or computer readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Particular implementations have been described in this document. Variations and enhancements of the described implementations and other implementations can be made based on what is described and illustrated in this document. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A non-transitory computer readable medium encoded with a computer program, the program comprising instructions that when executed by a data processing apparatus cause the data processing apparatus to perform operations comprising:
   displaying an image on a display device associated with a computer;
   displaying a cursor over a region of the image, the cursor including an inner periphery that defines an inner area, an outer periphery that defines an outer area between the inner periphery and the outer periphery, and an effect indicating periphery between the inner periphery and the outer periphery; and
   in response to receiving input to apply an effect at the region:
      applying an effect at the region:
         to a first intensity within the inner area defined by the inner periphery,
         variably across the outer area defined between the inner periphery and the outer periphery, the effect being graduated from the first intensity at the inner periphery to a second intensity at the outer periphery according to an intensity distribution,
      determining an intensity of the distribution that is based on the effect applied at the region, and is between the first intensity and the second intensity, and
      displaying the effect indicating periphery along the intensity of the distribution.

2. The computer readable medium of claim 1, wherein applying the effect to a first intensity within the inner area comprises applying the effect at a maximum intensity within the inner area.

3. The computer readable medium of claim 2, wherein the first intensity comprises the maximum intensity and the second intensity comprises a minimum intensity.

4. The computer readable medium of claim 3, wherein the intensity of the distribution along which the effect indicating periphery is displayed is approximately 50 percent of the maximum intensity.

5. The computer readable medium of claim 1, wherein the program comprises further instructions that when executed by the data processing apparatus cause the data processing apparatus to perform operations comprising:
   receiving a first setting corresponding to a size of the inner periphery; and
   adjusting the size of the inner periphery according to the first setting while maintaining a fixed size of the outer periphery.

6. The computer readable medium of claim 5, wherein the first setting comprises a softness setting.

7. The computer readable medium of claim 6, wherein the program comprises further instructions that when executed by the data processing apparatus cause the data processing apparatus to perform operations comprising:
   receiving a second setting corresponding to a cursor size; and
   adjusting the size of the outer periphery, based on the second setting and not based on the softness setting.

8. The computer readable medium of claim 1, wherein the program comprises further instructions that when executed by the data processing apparatus cause the data processing apparatus to perform operations comprising:
  displaying the cursor, including the outer periphery and the effect indicating periphery and adjusting the size of the effect indicating periphery dynamically as a softness setting is received while maintaining a fixed size of the outer periphery.

9. A non-transitory computer readable medium encoded with a computer program, the program comprising instructions that when executed by a data processing apparatus cause the data processing apparatus to perform operations comprising:
  receiving an adjustment to a softness setting for a brush in a user interface, the brush being adapted to apply an effect to a digital image;
  displaying the softness setting in the user interface as the adjustment is received;
  displaying, as the adjustment is received and adjacent to the user interface, a cursor corresponding to the brush based on the adjusted softness setting, the cursor having:
    an outer periphery indicating a maximum extent of an effect to be applied with the brush and
    an effect indicating periphery within the outer periphery indicating a softness of the brush; and
  changing a size of the effect indicating periphery relative to the outer periphery according to the received adjustment.

10. The computer readable medium of claim 9, wherein the program comprises further instructions that when executed by the data processing apparatus cause the data processing apparatus to perform further operations comprising:
  receiving an adjustment to a size setting for the brush;
  wherein a size of the effect indicating periphery is proportional to the brush size setting and based on a softness setting; and
  wherein a size of the outer periphery is proportional to the brush size setting and not the softness setting.

11. The computer readable medium of claim 9, wherein the outer periphery is displayed at a fixed size while the size of the effect indicating periphery is changed.

12. The computer readable medium of claim 9, wherein the program comprises further instructions that when executed by the data processing apparatus cause the data processing apparatus to perform further operations comprising:
  moving the displayed cursor over a region of an image after receiving the adjustment; and
  applying an effect to the image at the region, the effect being applied at a maximum intensity within an inner area defined by an inner periphery that is located within the effect indicating periphery, and the effect being applied from a maximum intensity at the inner periphery to a minimum intensity at the outer periphery; and
  wherein a size of the inner periphery is based on the softness setting and on a brush size setting.

13. The computer readable medium of claim 12,
  wherein the effect indicating periphery is located halfway between the outer periphery and the inner periphery.

14. A system comprising:
  a first memory device for storing a media content item that includes a digital image; and
  a computing system including processor electronics configured to perform operations comprising:
    displaying an image on a display device associated with a computer,
    receiving brush settings, including a brush size setting and a softness setting,
    displaying a cursor corresponding to the brush based on the brush settings over a region of the image, the cursor including an outer periphery and an effect indicating periphery within the outer periphery,
    in response to receiving input to apply an effect at the region:
      applying an effect at the region:
        to a first intensity within an inner area defined by an inner periphery located within the outer periphery, and
        variably across an outer area defined between the inner periphery and the outer periphery, the effect being graduated from the first intensity at the inner periphery to a second intensity at the outer periphery according to an intensity distribution,
      determining an intensity of the distribution that is based on the effect applied at the region, and is between the first intensity and the second intensity, and
      displaying the effect indicating periphery along the intensity of the distribution.

15. The system of claim 14, wherein the intensity distribution comprises an S-curve.

16. The system of claim 14, wherein applying the effect to a first intensity within the inner area comprises applying the effect at a maximum intensity within the inner area.

17. The system of claim 14, wherein first intensity comprises a maximum intensity and the second intensity comprises a minimum intensity.

18. The system of claim 14, wherein the processor electronics are configured to perform further operations comprising
  displaying the cursor as the softness setting is received, the effect indicating periphery changing size while the outer periphery is displayed at a fixed size.

19. The system of claim 14,
  wherein a radius of the inner periphery is based on the softness setting such that the softer the softness setting the smaller radius of the inner periphery and based on the brush size setting such that the larger the brush size setting the larger the inner periphery; and
  wherein displaying the effect indicating periphery along of the intensity of the distribution comprises displaying the effect indicating periphery at a percentage of a distance from the inner periphery to the outer periphery, wherein the percentage is based on the first intensity and the second intensity.

20. The system of claim 19, wherein the percentage is 50 percent.

21. A computer-implemented method comprising:
  displaying an image on a display device associated with a computer;
  displaying a cursor over a region of the image, the cursor including an inner periphery that defines an inner area, an outer periphery that defines an outer area between the inner periphery and the outer periphery, and an effect indicating periphery between the inner periphery and the outer periphery; and
  in response to receiving input to apply an effect at the region:
    applying an effect at the region:
      to a first intensity within the inner area defined by the inner periphery variably across the outer area defined between the inner periphery and the outer periphery, the effect being graduated from the first intensity at the inner periphery to a second intensity at the outer periphery according to an intensity distribution;

wherein displaying the cursor comprises displaying the effect indicating periphery along a predefined intensity of the distribution between the outer periphery and the inner periphery.

22. The method of claim 21, wherein the predefined intensity is approximately 50 percent of the maximum intensity.

23. The method of claim 21, wherein a radius of the outer periphery is based on a brush size setting and not the softness setting.

24. The method of claim 23,
wherein a radius of the inner periphery comprises a percentage of the radius of the outer periphery; and
wherein the percentage is based on the softness setting.

25. The method of claim 23, further comprising:
displaying brush settings corresponding to the cursor, including the brush size setting and the softness setting;
receiving adjustments changing the softness setting; and
displaying the cursor according to adjustments as the softness setting changes, including displaying the effect indicating periphery changing in size while outer periphery is displayed at a fixed size.

\* \* \* \* \*

UNITED STATES PATENT AND TRADEMARK OFFICE
CERTIFICATE OF CORRECTION

PATENT NO. : 8,810,596 B2  
APPLICATION NO. : 12/616640  
DATED : August 19, 2014  
INVENTOR(S) : Douglas Joseph Ahmann and Mark Lee Kawano It is certified that error appears in the above-identified patent and that said Letters Patent is hereby corrected as shown below:

In the Claims

In Column 14, In Line 52, In Claim 20, delete "19,wherein" and insert -- 19, wherein --, therefor.

In Column 14, In Line 67, In Claim 21, delete "periphery" and insert -- periphery, --, therefor.

Signed and Sealed this  
Fifth Day of May, 2015

Michelle K. Lee  
*Director of the United States Patent and Trademark Office*